United States Patent [19]

Bernard

[11] Patent Number: 5,027,201

[45] Date of Patent: Jun. 25, 1991

[54] MOTION DETECTION APPARATUS AS FOR AN INTERLACE TO NON-INTERLACE SCAN CONVERTER

[75] Inventor: Francis S. Bernard, Plainsboro, N.J.

[73] Assignee: RCA Licensing Corporation, Princeton, N.J.

[21] Appl. No.: 454,819

[22] Filed: Dec. 21, 1989

[51] Int. Cl.⁵ .................. H04N 7/18; H04N 11/20
[52] U.S. Cl. .................. 358/105; 358/11; 358/21 R
[58] Field of Search .................. 358/11, 4 R, 105, 140

[56] References Cited

U.S. PATENT DOCUMENTS

| | | | |
|---|---|---|---|
| 4,626,891 | 12/1986 | Achiha | 358/21 |
| 4,639,767 | 1/1987 | Suzuki | 358/105 |
| 4,651,211 | 3/1987 | Weckenbrock et al. | 358/166 |
| 4,661,853 | 4/1987 | Roeder et al. | 358/167 |
| 4,688,089 | 8/1987 | Uhlenkamp | 358/105 |
| 4,733,297 | 3/1988 | Katsumata et al. | 358/105 |
| 4,740,842 | 4/1988 | Annegarn et al. | 358/160 |
| 4,745,458 | 5/1988 | Hirano et al. | 358/105 |
| 4,760,446 | 7/1988 | Ninomiya et al. | 358/105 |
| 4,775,888 | 10/1988 | Nakagawa et al. | 358/105 |
| 4,794,454 | 12/1988 | Sugiyama et al. | 358/37 |
| 4,811,092 | 3/1989 | Achiha et al. | 358/105 |
| 4,851,901 | 7/1989 | Koga et al. | 358/105 |
| 4,862,267 | 8/1989 | Gillard et al. | 358/105 |
| 4,868,650 | 9/1989 | Weckenbrock | 358/105 |
| 4,901,145 | 2/1990 | Harradine et al. | 358/105 |

OTHER PUBLICATIONS

M. Achiha et al., "Movement Detection in NTSC Color TV Signals", PCS 86, Tokyo.

Primary Examiner—John K. Peng
Attorney, Agent, or Firm—Joseph S. Tripoli; Eric P. Herrmann; James B. Hayes

[57] ABSTRACT

A detector for detecting motion in an image represented by a video signal includes delay elements for providing lines of signal from five consecutive fields. Sums of signals from first and second fields are subtracted from sums of signals from third and fourth fields to generate first motion indicators. Differences of signals from the first and second fields are subtracted from differences of signals from the third and fourth fields to generate second motion indicators. Differences of signals from the first and fifth fields are generated to form third motion indicators. The first, second and third motion indicators are compared and the largest is provided as a motion signal which is subsequently limited, spread and scaled. Signals used in forming the motion indicators are selected to substantially reject any adverse influence of the chrominance subcarrier.

14 Claims, 4 Drawing Sheets

MOTION DETECTION APPARATUS AS FOR AN INTERLACE TO NON-INTERLACE SCAN CONVERTER

This invention relates to apparatus for detecting image motion in a video signal.

BACKGROUND OF THE INVENTION

It is well known in the video signal processing arts that the quality of reproduced images from transmitted video signals can be significantly enhanced through the use of temporal signal processing. Such temporal signal processing may take the form of field/frame comb filtering, field/frame recursive filtering for noise reduction and interlaced to non-interlaced scan conversion to name a few examples. It is also known that interframe image motion tends to introduce artifacts in temporally processed video signals. These artifacts may be rendered substantially unperceptible if the temporal processing apparatus is made adaptive responsive to image motion. Hence the need for apparatus to detect image movement.

A large variety of motion detection apparatus has been proposed. The majority of such apparatus determine differences between video signals separated by one frame interval. These interframe difference signals are processed in various methods to develop a resultant motion signal. U.S. Pat. Nos. 4,811,092 and 4,794,454 show examples of this type of motion detector.

In general, the one frame motion detectors do not provide satisfactory motion indication signals. It has been determined that more accurate motion detection may be effected by simultaneously analyzing signal differences between several fields or frames. For example, M. Achiha et al. of the Central Research Laboratory of Hitachi Ltd., in a paper entitled "Movement Detection in NTSC Color TV Signals" (PCS86 Tokyo), describes a method wherein a plurality of pixel values from two fields of a first frame are summed to produce a first average; a plurality of pixel values from two fields of the next adjacent exclusive frame are summed to produce a second average; and, the first and second averages are differenced to produce a raw motion signal which then undergoes further processing.

U.S. Pat. No. 4,626,891 shows motion detection apparatus utilizing signal from four consecutive fields wherein three frame differences are determined. One of the frame differences is temporally displaced from the other two by a field interval. The three differences are scaled and summed to generate a raw motion signal which thereafter undergoes further processing.

Nominally, the above mentioned apparatus operate on luminance and chrominance signals that have been separated from a composite video signal. However, perfect luminance/chrominance separation cannot be achieved. Residual cross components in either of the separated signals tend to introduce errors in motion signals developed by the prior art motion detection apparatus.

It is an object of the present invention to provide an improved image motion detection apparatus. One feature of the invention is less susceptibility to generating errors resulting from cross components when detecting image motion in separated luminance component signals.

SUMMARY OF THE INVENTION

The present invention includes image motion detection apparatus having delay means for concurrently providing a plurality of signals representing successive fields of a video signal. Video signal from a first pair of successive fields are combined in a first polarity sense to generate a first combined signal. Video signal from a second pair of successive fields, exclusive of the first pair, are also combined in the first polarity sense to generate a second combined signal. The first combined signal is subtracted from the second combined signal to form a first motion indicator. Video signal from the first and second pairs of successive fields are respectively combined in a second polarity sense to form third and fourth combined signals. The third combined signal is subtracted from the fourth combined signal to form a second motion indicator. Video signals separated by two frame intervals are combined in the second polarity sense to form a third motion indicator.

The respective motion indicators are applied to a maximum detector which selects the largest valued motion indicator as a motion signal.

DETAILED DESCRIPTION

The invention will be described in the environment of an interlace to non-interlace scan converter, however it should be appreciated that it will have broader application, for example, in motion adaptive frame comb filters or motion adaptive temporal recursive filters. Further, the signals are assumed to be in pulse code modulated (PCM) sampled binary format though the invention may be practiced on analog signals with appropriate selection of hardware.

Image motion is determined by examining signal differences from five successive fields of video signal. Preferably the video signal to be examined is a separated luminance component. It is presumed, however, that the luminance component may include residual chrominance signal. The residual chrominance signal is presumed to be in the form of a modulated subcarrier, with the subcarrier being substantially antiphase from line-to-line within a field and antiphase from frame-to-frame.

Figure 1:
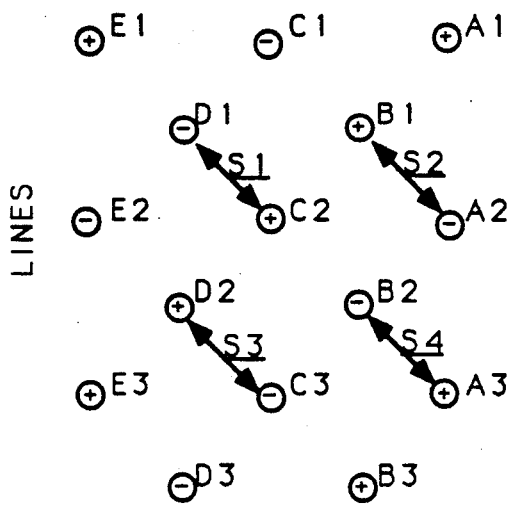
FIGS. 1, 2 and 3 are pictorial representations of portions of successive fields of video signal useful for an understanding of the invention.

Referring to FIG. 1, the circles are intended to represent video signal from respective horizontal lines in respective fields. The lines (circles) designated Ai represent lines in the current field. The lines designated Bi represent lines in the last most preceding field. The lines designated Ci represent lines in the second lastmost field and so on. The + and − signs in respective circles indicate the relative subcarrier phase of any chrominance signal included in the signal being examined. With respect to the following discussion of FIGS. 1 to 3, in the given environment, an indication of motion or non motion is determined for a point on a line of video signal located midway between lines A2 and A3, i.e., on an interstitial line generated by a motion adaptive interlace to non-interlace converter. The matrices of circles shown in FIGS. 2 and 3 correspond to the matrix of circles in FIG. 1.

The motion detection algorithm proceeds as follows. Signal from lines connected by arrows are added together (FIG. 1) to form the sums S1, S2, S3 and S4. It will be noted that the chrominance component of each pair of signals that are added are antiphase, and due to the highly redundant nature of video signals, the chrominance signal tends to be cancelled in each sum Si (in the absence of image motion). Each sum Si represents a twice luminance signal value. The sum S1 is subtracted from sum S2, and the absolute value of the difference is determined and designated R1. Similarly, the absolute value of the difference of sums S3 and S4 is determined and designated R2. The signals R1 and R2 are defined herein as downward motion indicators.

Figure 2:
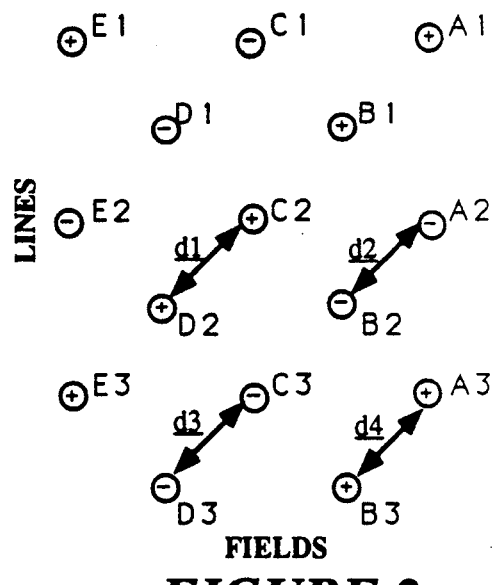

As the differences of sums of the signals represented in FIG. 1 are generated, the signals from the lines connected by arrows in FIG. 2 are subtractively combined to form the differences di. It will be noted that the chrominance component of the pairs of signals that are combined in FIG. 2 have like phase. Hence, the chrominance component again tends to be cancelled (in the absence of motion).

The absolute value of the differences di are determined to generate signals di'. Thereafter the absolute value of the difference between the signals d1' and d2' is generated to produce a further motion indicator R3. Similarly, the absolute value of the difference between the signals d3' and d4' is generated to produce a motion indicator R4. The motion indicators R3 and R4 are defined as upward motion indicators.

Figure 3:
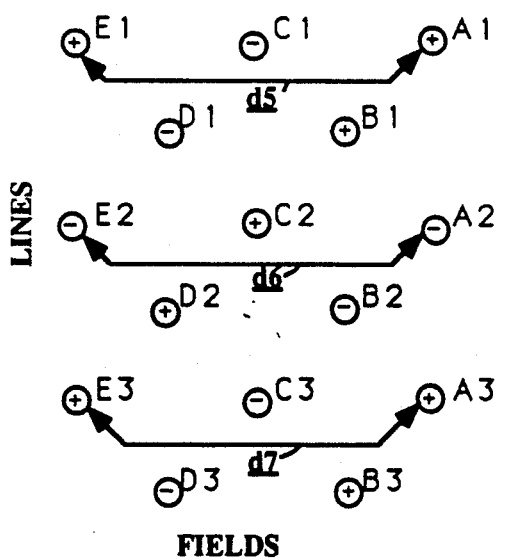

As the motion indicators R1-R4 are formed, a further set of motion indicators (R5-R7) is formed according to the combinations indicated in FIG. 3. Signals from lines separated by two frame periods (shown connected by arrows in FIG. 3) are subtractively combined, and the absolute values of the differences formed. For example, the absolute value of the difference d5 of signals from lines E1 and A1 corresponds to the motion indicator R5. Similarly, the absolute value of the difference d7 of signal from lines E3 and A3 corresponds to the motion indicator R7. The chrominance component of the signals combined (in FIG. 3) have like phase and thus the chrominance is cancelled in the differencing process. The motion indicators R5-R7 are defined as forward motion indicators.

Sums of respective signals designated in FIG. 1 are formed, while differences of respective signals designated in FIGS. 2 and 3 are formed. If differences of the designated signals in FIG. 1 were formed, and if a residual chrominance component existed, the chrominance components would sum rather than cancel, and even in the absence of image motion, the summed chrominance component could generate a false indication of motion. For this reason signals from respective lines cannot be indiscriminately selected for either summing or differencing, i.e., signals with like chrominance subcarrier phase should not be summed and signals with antiphase chrominance subcarrier should not be differenced.

The motion indicators R1-R7 are compared and the largest thereof is output as a motion indication signal. This motion indication signal is further processed as will be described hereinafter with respect to FIGS. 4 and 6-8.

Figure 4:
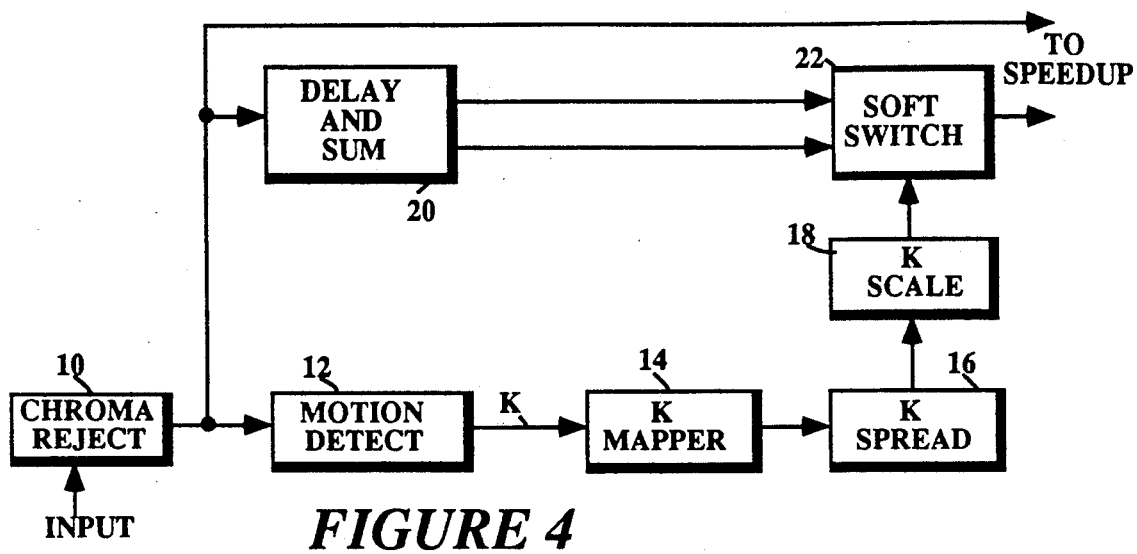
FIG. 4 is a block diagram of a portion of an interlace to non-interlace scan converter including motion sensing circuitry embodying the present invention.

Referring next to FIG. 4, a portion of motion adaptive interlace to non-interlace converter is shown. The particular converter is of the type which generates interstitial video lines to be displayed between real lines. The generated interstitial and real lines are coupled to conventional speed up circuits (not shown) wherein they are time compressed to one-half normal line times and, alternatively, sequenced for display.

In FIG. 4 separated luminance signal or composite video signal is coupled to a filter 10 which is arranged to substantially reject the chrominance subcarrier. A representative transfer function (H1) for the filter 10 is given by $$H1 = 0.5(1 + Z^{-2}) \tag{1}$$

where $Z^{-2}$ represents a delay of one-half the subcarrier period. If the input signal is separated luminance (including only residual chrominance, the system performs well without the filter, however motion detection sensitivity is enhanced with the filter included.

Signal from the filter 10 is provided to the speed up circuitry as a real line of luminance signal, and is also coupled to a motion detector 12 and a delay and sum circuit 20. The delay and sum circuit 20 provides two alternative interstitial line signals which are applied to a soft switch 22. The soft switch 22, responsive to a motion indicative signal selects one or the other, or a combination of both alternative interstitial line signals for application to the speed up circuitry.

The motion detector 12 performs the algorithm described with reference to FIGS. 1-3, responsive to the signal provided by the filter 10. In addition, the detector 12 includes a lowpass filter to provide a degree of smoothing to the motion signal. Typically the output signal provided by the detector 12 is a multibit signal of, e.g., 8 bits.

Nominally video signals include a degree of noise, which noise can be substantially eliminated from the motion signal by passing only those motion signals which exceed a predetermined value. However thresholding the motion signal tends to cause certain motion occurrences to not be detected. In addition, certain image transitions may be moving too fast to be detected. In order to accommodate such missed motion, the motion signal is spread in three directions horizontal, vertical and temporal. See U.S. Pat. No. 4,733,297 for a discussion of motion signal spreading. In brief, spreading means extending the indication of motion beyond the point at which motion is detected.

In order to minimize the hardware required for motion signal spreading, the multibit motion signal from the detector 12 is mapped into a motion signal of lesser bit width by a mapper circuit 14. In addition to reducing the bit width of the motion signal, the mapper performs the threshold function to minimize false motion detection due to noise in the signal.

The reduced bit width motion signal from the mapper 14 is applied to the spreader 16. The expanded or spread motion signal is coupled to a scaling circuit 18 which translates the motion signal to a bit width of, e.g., 8 bits. This latter expansion of bit width reduces quantization error which may be incurred by the utilization of a coarsely quantized motion signal. The scaled motion signal from the scaler circuit 18 is coupled to control the soft switch 22.

Figure 5:
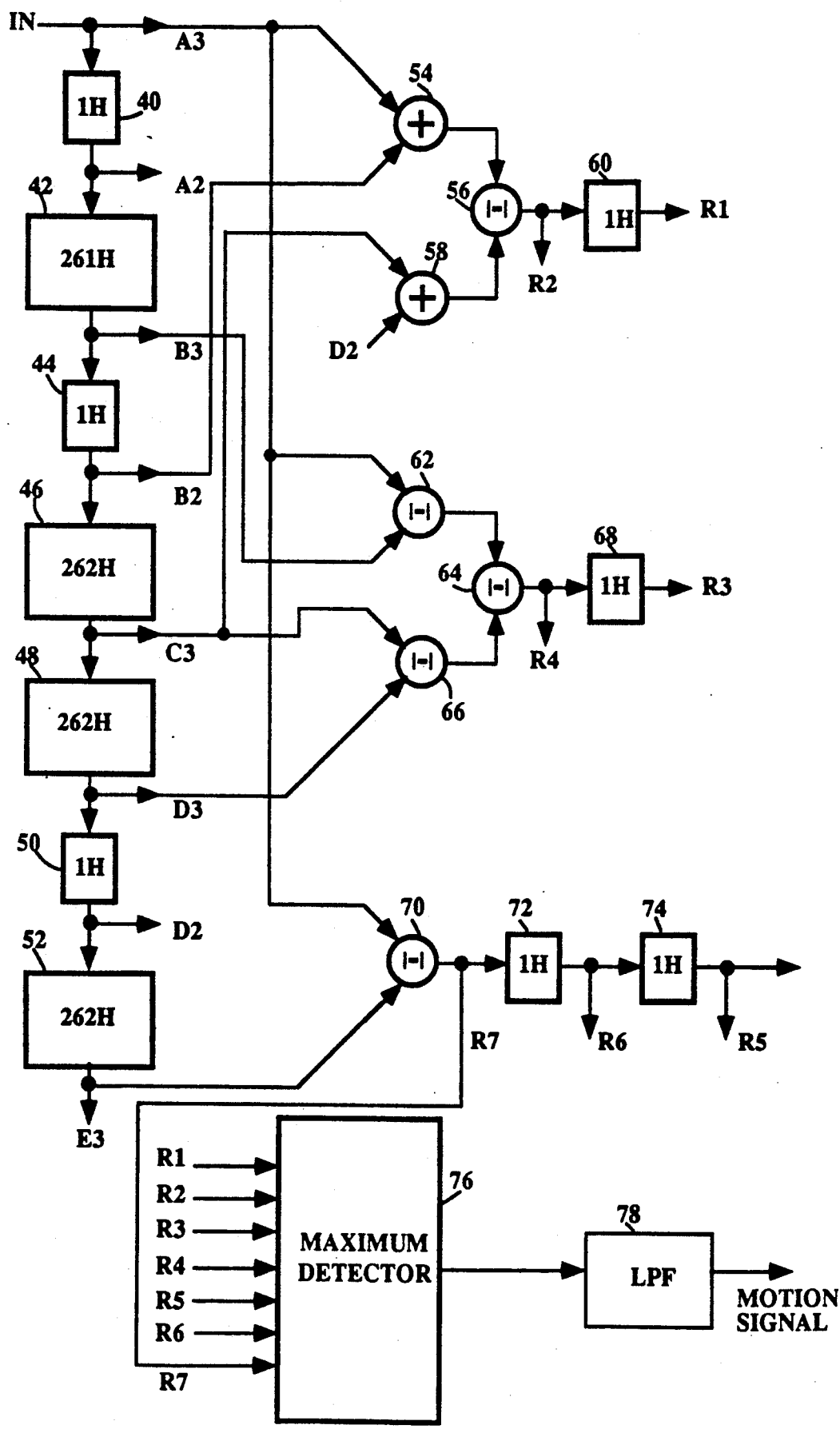
FIG. 5 is a block diagram of a motion detector embodying the present invention.

An exemplary embodiment of the motion detector 12 is illustrated in FIG. 5. The apparatus of FIG. 5 does not generate all seven motion indicators R1-R7 simultaneously. Since respective ones of the motion indicators are generated from lines that occur one horizontal period later than other lines, motion indicators from earlier lines may be delayed a horizontal period such that they are available when the next subsequent indicator is generated. For example, if motion indicator R1 is generated, by specific summing and differencing circuitry, and delayed one line period, at the termination of this delay period the specific summing and differencing circuitry will be providing motion indicator R2, representing lines occurring one line period later in time than the lines from which indicator R1 was generated. Generating the motion indicators in this manner, rather than generating all motion indicators simultaneously saves significant circuitry.

In FIG. 5 the signal to be examined is applied to the cascade connection of delay elements 40-52 which provide, respectively, signals delayed by 1, 262, 263, 525, 787, 788 and 1050 line intervals, corresponding to lines A2, B3, B2, C3, D3, D2 and E3 in FIGS. 1-3. The input signal to delay element 40 corresponds to line A3.

Input signal (A3) and output signal (B2) from the delay element 44 are coupled to an adder circuit 54 which forms the sum S4. Signals C3 and D2 provided by delay elements 46 and 50 are coupled to an adder circuit 58 which forms the sum S3. The sums S3 and S4 from adder circuits 54 and 58 are coupled to a subtracter circuit 56 which provides the absolute value of the difference between the signals applied to its input terminals. The output provided by the subtracter circuit 56 is the motion indicator R2 which is coupled to a one horizontal line period delay element 60. Delay element 60 always provides the motion indicator, e.g. R1, developed from horizontal lines occurring one line period prior to the current set of lines used to produce motion indicator R2. Thus motion indicators R2 and R1 are concurrently available from the input and output terminals of the delay element 60.

Input signal (A3) and signal (B3) provided by the delay element 42 are coupled to a subtracter circuit 62, which provides the absolute value of the difference (d4) of the two signals coupled thereto. Signal (C3) from the delay element 46 and signal (D3) from the delay element 48 are coupled to a subtracter circuit 66, which provides the absolute value of the difference (d3) of these two signals. The differences provided by the subtracter circuits 62 and 66 are coupled to a further subtracter circuit 64 which provides the absolute value of the difference (R4) of the two differences applied to its input terminals. The output from subtracter circuit 64 is coupled to a one-horizontal-line-period delay element 68. Difference signals occurring at the input and output terminals of the delay element 68 correspond to motion indicator R4 and R3, respectively.

Input signal (A3) and signal (E3) provided by the delay element 52 are coupled to a subtracter circuit 70. Subtracter circuit 70 provides the absolute value of the difference of the signals applied to its inputs, which difference corresponds to the motion indicator R7. Output signals from the subtracter circuit 70 are coupled to the cascade connected one-horizontal-line-period delay elements 72 and 74. Delay elements 72 and 74 provide the previously calculated motion indicators R6 and R5, respectively.

The seven motion indicator signals R1-R7 are coupled to a maximum detector 76 which passes the motion indicator having the largest amplitude. The motion indicator provided by the detector 76 is coupled to a lowpass filter 78. The purpose of the filter is to remove high frequency noise which may have been introduced by the maximum operator and to provide some horizontal smoothing. Filter 78 is a finite impulse response filter with binomial coefficients. An exemplary transfer function $H_2(Z)$ for the filter 78 is given by, $$H_2(Z) = C1 + C2Z^{-1} + C3Z^{-2} + C4Z^{-3} + C5Z^{-4} + C6Z^{-5} + C7Z^{-6} \quad (2)$$

where $C1 = C7 = 0.01562$; $C2 = C6 = 0.09375$; $C3 = C5 = 0.23487$ and $C4 = 0.3125$ and where Z corresponds to the conventional "Z" transform variable with $Z^{-1}$ representing a delay of one-quarter cycle of the chrominance subcarrier.

At the risk of sacrificing performance, the system may be simplified by using less than all of the motion indicators R1-R7. For example, if R1 and R5 are not utilized, then delay elements 60 and 74 may be eliminated and the maximum detector simplified. Such a change involves not an insignificant amount of hardware.

Figure 6:
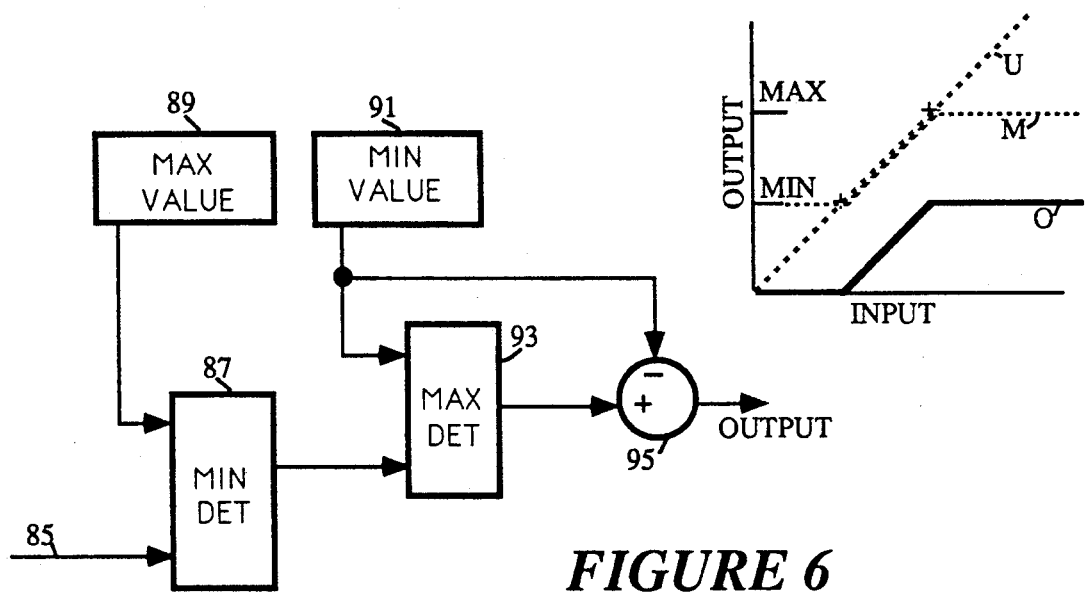
FIG. 6 is a block diagram of a motion signal mapper which may be utilized for the circuitry 14 of FIG. 4.

An exemplary embodiment of the mapper circuit 14 is shown in FIG. 6. This circuitry accepts an N-bit motion signal and provides, in general, an M-bit motion control signal "K" where M is less than N. For all values of the motion signal, less than a threshold value (designated min value), the circuitry provides a zero valued output. For all values of the motion signal greater than an upper threshold value (designated max value) the circuitry provides a constant limit value. For motion signals between the max and min values, the circuitry provides a linear output signal with a DC offset. The transfer function is indicated in FIG. 6. The dotted line, U, represents an unmodified response with the min value set at zero and the max value set at 255 (assuming 8-bit samples). The response designated, O, represents the circuit transfer function with the arbitrary min and max values shown. The portion of the transfer function, U, falling between the min and max values is translated such that its lower limit falls on the zero axis. For input values greater than the max value, the output (curve O) is clamped to the value max-min. Typically, the value max-min will be four or eight, which values can be represented by two or three bits, respectively.

In FIG. 6 the max and min values are provided by sources 89 and 91, respectively. These values may be programmed into the system or provided by a user interface. Note for example, if the system output is constrained to a two-bit value, the min value may be provided by the user, and the max value may be provided by including an adder to add the value four to the min value. The min value establishes the motion signal noise threshold. Therefore it is desirable to provide the user the capability of adjusting this value to his particular reception conditions.

The motion signal from the lowpass filter 78 is applied via connection 85 to one input terminal of a minimum detector 87. The max value from source 89 is applied to a second input terminal of the minimum detector 87. The smaller of the max value or the motion signal is passed by the detector 87 to one input of a maximum detector 93. The min value from the source 91 is coupled to a second input of the maximum detector 93 which passes the larger of the min value or the signal passed by detector 87. Output signal from the maximum detector 93 is clamped to the min value for motion signals less than the min value, is clamped to the max value for motion signals greater than the max value, and follows the motion signal for amplitudes of the motion signal occurring between the max and min values, (curve M in FIG. 6).

The output from maximum detector 93 is coupled to a minuend input terminal of a subtracter 95. The min value is coupled to the subtrahend input terminal of the subtracter 95. Output signal from the subtracter 395 (curve O in FIG. 6) corresponds to the output provided by detector 93 offset in the negative direction by an amount equal to the min value. Signal from the subtracter 95 is designated K and is applied to the spreader circuit 16.

Figure 7A:
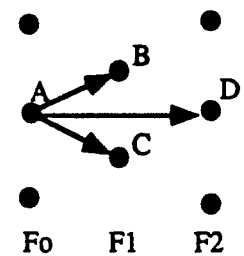
FIG. 7A is a pictorial representation of a portion of successive fields of video signal useful in describing the function of a portion of the FIG. 7 circuitry.
Figure 7:
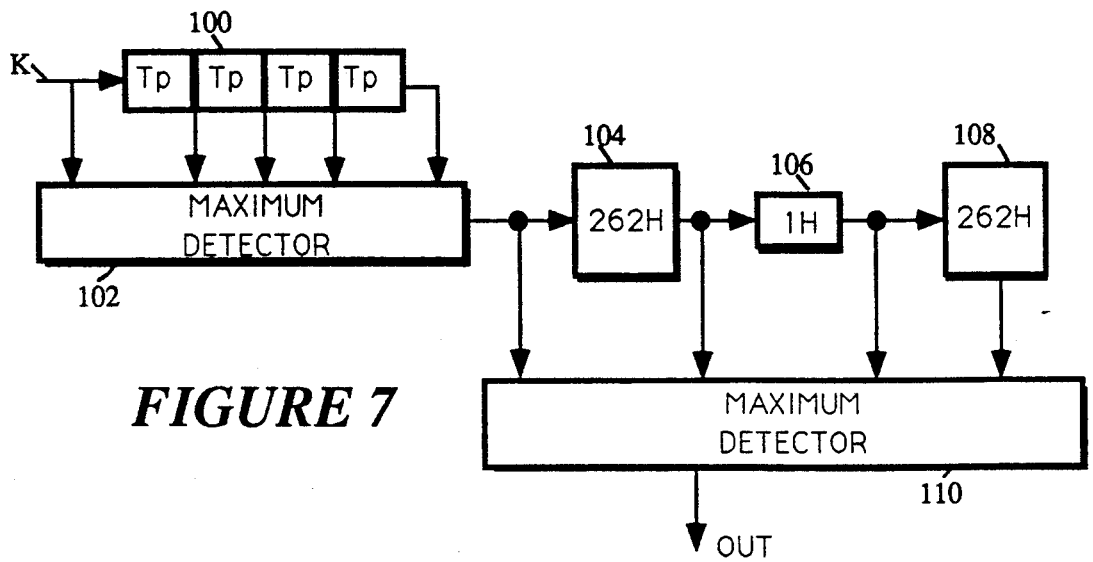
FIG. 7 is a block diagram of a motion signal spreader which may be utilized for the circuitry 16 of FIG. 4.

An exemplary spreader circuit is illustrated in FIG. 7. The signal K is applied to a cascade connection of four one-sample-period delay elements 100 and to one input of a maximum detector 102. Successively delayed K signals from each of the delay elements are applied to respective input terminals of the maximum detector 102. The maximum detector 102 passes the larger of the signals applied to its input terminals. Assuming a zero valued K signal indicates no motion; the combination of elements 100 and 102 expands the time of occurrence of a motion signal four sample periods along the horizontal scan direction.

Signal from the maximum detector 102 is coupled to the cascade connected delay elements 104, 106 and 108 and to one input terminal of a maximum detector 110. Delay elements 104-108 delay the K signal by 262, 1 and 262 horizontal intervals, respectively. Delayed K signals from the respective delay elements are coupled to respective further input terminals of the maximum detector 110. The detector 110 passes the larger of the signals applied to its respective input terminals. The combination of delay elements 104-108 and the detector 110 spreads the K signal vertically by one line and temporally by one frame. Referring to FIG. 7A, assume that motion has been detected at a point on line A field F0. The elements 104-110 cause this motion signal to also occur at corresponding points on lines B and C in field F1 (vertical spread) and a corresponding point on line D in field F2 (temporal spread). Note field F1 follows field F0 and field F2 follows field F1.

As mentioned previously, the soft switch 22 selects or combines one of two alternative signals as an output interstitial line. Assume that the two alternative signals are designated X1 and X2, and that these signals are selected or combined in the proportions KX1+(1−K)X2. Remember also that the values min and max are selectable. The potential dynamic range of the K value provided by the mapper circuit 14 is determined by the number of bits provided for the K signal (e.g., a dynamic range of 7 for a 3-bit signal). The actual dynamic range is limited by the value max-min which may be less than the potential dynamic range. Regardless of the value of max-min that is selected, the maximum and minimum values of the actual dynamic range should elicit the same response from the soft switch. Intermediate values of the actual dynamic range should also proportionately elicit like responses. This is accomplished by scaling the K value according to the difference between the max and min values applied to the mapper circuit 14. The scaling circuit 18 performs this function as follows. If W is the actual dynamic range of the signal K, and R is the potential dynamic range of the signal applied to the soft switch, scaling is accomplished according to the function K/W times R.

Figure 8:
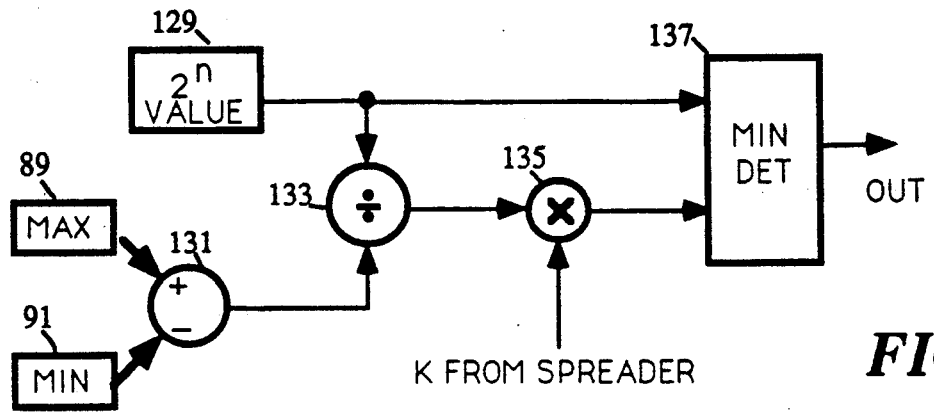
FIG. 8 is a block diagram of a motion signal scaler which may be utilized for the circuitry 18 of FIG. 4.

An embodiment of the scaling circuit 18 (FIG. 4) is illustrated in FIG. 8. In FIG. 8 the max and min values from the sources 89 and 91 are coupled to a subtracter 131 which generates the value max-min. This value is coupled as a divisor to a divider circuit 133. A value $2^n$ from a source 129 is coupled to the dividend input to the divider circuit 133. The exponent n is equal to the number of bits desired of the control signal K applied to the soft switch 22, that is, the value $2^n$ defines the range of the control signal. In this example assume n=8 such that the control signal has 256 possible values. The output of the divider circuit is thus the integer part of 255/(max-min). The quotient generated by the divider 133 is coupled to one input terminal of a multiplier circuit 135. The K signal from the spreader 16 is coupled to a second input terminal of the multiplier circuit 135. The product ($2^n$ K/W) generated by the multiplier 135 and the value $2^n$ from the source 129 are coupled to respective input terminals of a minimum detector 137 which passes the lesser valued input value as the control value K. The minimum detector precludes values greater than $2^n$ occurring as the control value K, which may result from quantization errors or noise in the raw K value.

Figure 9:
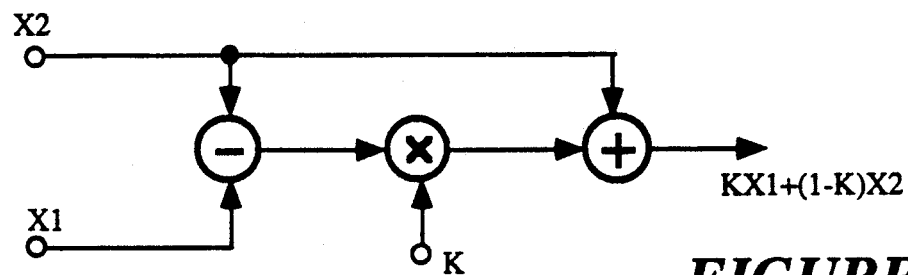
FIG. 9 is a schematic diagram of an exemplary soft switch.

An exemplary soft switch is illustrated in FIG. 9. This soft switch is well known and will not be described. Suffice it to say that two input signals X1 and X2 are applied to respective signal input terminals, a control signal K is applied to a control input terminal and the circuitry provides an output signal, Out, given by $$Out = KX1 + (1-K) X2 \qquad (3)$$

Figure 10:
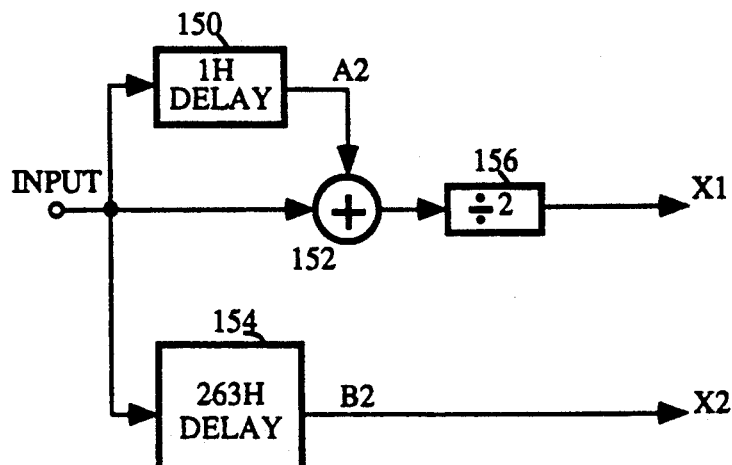
FIG. 10 is a block diagram of circuitry for providing alternative interstitial line signals which may be used to perform the function of delay and sum element 20 of FIG. 4.

FIG. 10 illustrates an exemplary embodiment of the delay and sum circuitry 20 for providing two alternative interstitial line signals. One of these signals, X2, is simply a field delayed version of the input signal. The other signal, X1, is the average of signal representing two lines of the current field, i.e., lines A2 and A3.

In FIG. 10 current video signal (e.g., A3) is applied via an input connection to the input terminals of a one-horizontal-line-period delay element 150, a 263-horizontal-line-period delay element 154, and an adder circuit 152. The output of the delay element 154 corresponds to line B2 and is one of the interstitial lines X2.

The output of the delay element 150 corresponds to line A2 and is coupled to the adder 152. The adder generates a signal corresponding to A3+A2, that is, to corresponding points on lines A2 and A3. This sum, normalized by dividing it by two in a divider circuit 156, is provided as the other interstitial line signal X1.

In an alternative arrangement wherein the motion signal is used to control a motion adaptive comb filter, the alternative signals X1 and X2 may be provided by line comb and frame comb filters, respectively.

What is claimed is:

1. Image motion detection apparatus for detecting image motion in video signals formatted in fields of interlaced lines, said apparatus comprising:

a source of video signal;

provider means, coupled to said source, for providing a plurality of signals representing a plurality of lines from a plurality of said fields;

first means, coupled to said provider means, for generating first motion indicators representing the magnitude of the difference between a first sum of signals representing lines from first mutually exclusive fields and a second sum of signals representing lines from second mutually exclusive fields;

second means, coupled to said provider means, for generating second motion indicators representing the magnitude of the difference between the magnitude of a first difference of signals representing lines from said first mutually exclusive fields and the magnitude of a second difference of signals representing lines from said second mutually exclusive fields, wherein said first and second differences are formed from signals representing different combinations of lines than the combination of lines from which the first and second sums are formed;

third means, coupled to said provider means, for generating third motion indicators representing the magnitude of a third difference between signals representing lines from said first mutually exclusive fields and a further field exclusive of said first and second mutually exclusive fields;

a maximum detector, responsive to said first, second and third motion indicators, for providing the largest of said first, second and third motion indicators as a motion signal.

2. The image motion detection apparatus set forth in claim 1 wherein said first means includes delay means for delaying said first motion indicators by one line period to provide a set of at least two first motion indicators; and wherein said third means includes means for delaying said third motion indicators by one line period to provide a set of at least two third motion indicators; and wherein said maximum detector is responsive to said set of first motion indicators, said second motion indicators and said set of third motion indicators.

3. The image motion detection apparatus set forth in claim 2 wherein said second means includes delay means for delaying said second motion indicators by one line period to provide a set of at least two second motion indicators; and wherein said maximum detector is responsive to said set of first motion indicators, said set of second motion indicators and said set of third motion indicators.

4. The image motion detection apparatus set forth in claim 1 wherein each of said lines has an associated chrominance subcarrier phase, and wherein said first means includes means for summing signals representing lines having opposite associated chrominance subcarrier phase, and wherein said second and third means include means for differencing signals representing lines having like associated chrominance subcarrier phase.

5. The image motion detection apparatus set forth in claim 1 wherein said motion signal is represented by a first range of amplitude values, and said apparatus further includes:

means, responsive to said motion signal, for limiting said motion signal to a second range of amplitude values less than said first range of amplitude values wherein motion signals greater and lesser than predetermined maximum and minimum amplitude values are clamped to said maximum and minimum amplitude values respectively to generate a limited motion signal; and means responsive to said limited motion signal for offsetting said limited motion signal to generate a control signal having a further predetermined minimum value.

6. The image motion detection apparatus set forth in claim 5 further including means for expanding said control signal in horizontal, vertical and temporal directions.

7. The image motion detection apparatus set forth in claim 6 wherein said means for expanding said control signal includes:

first tapped delay means, for providing a plurality of delayed signals each of which is delayed by successive periods of a submultiple of a chrominance subcarrier period;

first maximum detection means, coupled to said first tapped delay means and responsive to said plurality of delayed signals, for passing the largest of said plurality of delayed signals;

second tapped delay means, for providing a further plurality of signals delayed by zero; 262; 263; and 525 line periods;

second maximum detection means, coupled to said second tapped delay means and responsive to said further plurality of delayed signals, for passing the largest of said further plurality of delayed signals; and means for serially coupling said first tapped delay means and said first maximum detection means with said second tapped delay means and said second maximum detection means, to process said control signal.

8. The image motion detection apparatus set forth in claim 5 further including:

means coupled to said means for limiting said motion signal, for scaling said control signal according to the functin F given by $$F = K*R/(\text{max} - \text{min})$$

where K is the value of the control signal, R is the desired range of the scaled control signal, and max and min are said predetermined maximum and minimum values.

9. The image motion detectin apparatus set forth in claim 5 wherein said means, responsive to said motion signal, for limiting said motion signal to a second range of values comprises:

a source of said maximum and minimum amplitude values;

a minimum detector having a first input coupled to said source of said maximum amplitude value, having a second input, and haivng an output for passing the lesser valued signal applied to its inputs;

a further maximum detector having a first input coupled to said source of said minimum amplutide value, having a second input, and having an output for passing the greater valued signal applied to its inputs;

means for serially coupling said minimum detector and said further maximum detector with said means for offsetting said limited motion signal, wherein the second input of one of the minimum detector and the further maximum detector is coupled to said maximum detector and the second input of the other of said minimum detector and the further maximum detector is coupled to the output of said one of the minimum detector and the further maximum detector.

10. Image motion detection apparatus for detecting image motion in video signals formatted in fields of interlaced lines, said apparatus comprising:

a source of video signal;

provider means, coupled to said source, for providing a plurality of said fields;

first means, coupled to said provider means, and responsive to signals representing lines from four successive fields for generating downward motion indicators;

second means, coupled to said provider means and responsive to signals representing lines from four successive fields for generating upward motion indicators wherein at least one of the lines used to generate said upward motion indicator is different from the lines used to generate said downward motion indicators;

third means, coupled to said provider means, and responsive to signalsss representing lines from a current field and a field separated therefrom by four field intervals, for generating forward motion indicators; and means, responsive to said upward, downward, and forward motion indicators, for passing the largest of said upward, downward, and forward motion indicators as a motion signal.

11. The image motion detection apparatus set forth in claim 10 wherein said first means comprises:

first summing means for summing signals representing lines separated by 263 line intervals occurring in first and second fields to generate a first sum signal;

second summing means for summing signals representing lines separated by 263 line intervals occurring in third and fourth fields exclusive of said first and second fields, to generate a second sum signal; and means, responsive to said first and second sum signals, for providing as said downward motion indicator, the magnitude of the difference of said first and second sum signals.

12. The image motion detection apparatus set forth in claim 11 wherein said second means comprises:

first differencing means for generating the magnitude of the difference of signals representing lines separated by 262 lines intervals occurring in said first and second fields to generate a first difference signal;

second differencing means for generating the magnitude of the difference of signals representing lines separated by 262 line intervals occurring in said third and fourth fields to generate a second difference signal; and means, responsive to said first and second difference signals, for providing as said upward motion indicator, the magnitude of the difference of said first and second difference signals.

13. The image motion detection apparatus set forth in claim 12 wherein said third means comprises:

third differencing means for generating the magnitude of the difference of signals representing lines separated by 1050 line intervals occurring in said first and a fifth field to generate said forward motion indicator.

14. The image motion detection apparatus set forth in claim 10 wherein said means for passing the largest of said upward, downward, and forward motion indicators as a motion signal comprises a maximum detector.

* * * * *